(12) United States Patent
Sabharwal et al.

(10) Patent No.: US 11,340,898 B1
(45) Date of Patent: May 24, 2022

(54) SYSTEM AND METHOD FOR AUTOMATING SOFTWARE DEVELOPMENT LIFE CYCLE

(71) Applicant: HCL Technologies Limited, New Delhi (IN)

(72) Inventors: Navin Sabharwal, New Delhi (IN); Amit Agrawal, Mathura (IN)

(73) Assignee: HCL Technologies Limited, Noida (IN)

( * ) Notice: Subject to any disclaimer, the term of this patent is extended or adjusted under 35 U.S.C. 154(b) by 0 days.

(21) Appl. No.: 17/197,035

(22) Filed: Mar. 10, 2021

(51) Int. Cl.
| G06F 9/44 | (2018.01) |
| G06F 8/77 | (2018.01) |
| G06F 8/41 | (2018.01) |
| G06F 9/30 | (2018.01) |
| G06K 9/62 | (2022.01) |
| G06N 3/08 | (2006.01) |
| G06F 8/30 | (2018.01) |

(52) U.S. Cl.
CPC .............. *G06F 8/77* (2013.01); *G06F 8/31* (2013.01); *G06F 8/433* (2013.01); *G06F 9/30036* (2013.01); *G06K 9/6256* (2013.01); *G06N 3/08* (2013.01)

(58) Field of Classification Search
None
See application file for complete search history.

(56) References Cited

U.S. PATENT DOCUMENTS

| 10,146,530 B1* | 12/2018 | Rajput ..................... G06F 8/71 |
| 10,685,284 B2* | 6/2020 | Smyth .................. G06N 3/0454 |
| 2017/0212829 A1* | 7/2017 | Bales ..................... G06F 8/433 |
| 2019/0228319 A1* | 7/2019 | Gupta ....................... G06F 8/73 |
| 2019/0391792 A1* | 12/2019 | Sabharwal .............. G06N 3/08 |
| 2021/0117305 A1* | 4/2021 | Raszka .............. G06F 11/3608 |
| 2021/0383068 A1* | 12/2021 | Mattivi ............... G06F 16/9024 |

FOREIGN PATENT DOCUMENTS

WO      2019051426 A1     3/2019

* cited by examiner

*Primary Examiner* — Qamrun Nahar
(74) *Attorney, Agent, or Firm* — Kendal Sheets

(57) ABSTRACT

The invention relates to system and method for automating software development life cycle. In some embodiments, the method includes receiving a plurality of code snippets being utilized for developing a software application from a plurality of sources in a software development life cycle, generating a plurality of embedding vectors corresponding to the plurality of code snippets, and generating a high-level feature vector corresponding to each of the plurality of code snippets based on the corresponding embedding vector using a deep learning model. The method further includes generating a final merged code comprising a final sequence of code lines by combining the sequence of code lines corresponding to the plurality of code snippets using the deep learning model. The deep learning model is trained to generate the high-level feature vector and arrange the sequence of code lines based on historical data from the software development life cycle.

20 Claims, 7 Drawing Sheets

SYSTEM AND METHOD FOR AUTOMATING SOFTWARE DEVELOPMENT LIFE CYCLE

TECHNICAL FIELD

Generally, the invention relates to software development. More specifically, the invention relates to system and method for automating software development life cycle.

BACKGROUND

Conventionally, developers are involved while developing a software application or a feature in order to develop a code. Thereafter, the code developed by different developers may be passed to reviewers, such as, reviewers in a testing team. Further, the reviewers may check the code received from the developers. The reviewers may assign back the code to the developers in case of any issue. Now, the developers need to resolve issues and then submit again to reviewers. This process may persist till the reviewers verify the code and send it to a build stage. In build stage, the code may be compiled. Hence, there are multiple steps need to be performed manually during a software development life cycle.

The convention process requires a lot of manual efforts and this may lead to human errors sometimes. Various conventional systems and methods are available, but most of them are focused on identifying bugs, or using exiting code snippets to develop an application. However, the conventional systems may not proactively identify performance and merger conflict issues in the software application, when new features are released.

Therefore, there is a need to develop a system and method that may automate the software development life cycle by not only identifying issues but also resolving any merge conflicts in developers' code.

SUMMARY

In one embodiment, a method for automating software development life cycle is disclosed. The method may include receiving a plurality of code snippets being utilized for developing a software application from a plurality of sources in a software development life cycle. It should be noted that each of the plurality of code snippets may include a sequence of code lines. The method may further include generating a plurality of embedding vectors corresponding to the plurality of code snippets. It should be noted that each embedding vector may capture dependency amongst the code lines in the corresponding code snippet. The method may further include generating a high-level feature vector corresponding to each of the plurality of code snippets based on the corresponding embedding vector using a deep learning model. The method may further include generating a final merged code including a final sequence of code lines by combining the sequence of code lines corresponding to the plurality of code snippets using the deep learning model. The deep learning model may be configured to iteratively arrange the sequence of code lines corresponding to each of the plurality of code snippets, based on the high-level feature vector corresponding to each of the plurality of code snippets, in order to resolve a merge conflict amongst the plurality of code snippets. It should be noted that the deep learning model may be trained to generate the high-level feature vector and arrange the sequence of code lines based on historical data from the software development life cycle.

In another embodiment, a system for automating software development life cycle is disclosed. The system may include a processor and a memory communicatively coupled to the processor to receive a plurality of code snippets being utilized for developing a software application from a plurality of sources in a software development life cycle. It should be noted that each of the plurality of code snippets may include a sequence of code lines. The memory may store processor-executable instructions, which, on execution, may causes the processor to generate a plurality of embedding vectors corresponding to the plurality of code snippets. It should be noted that each embedding vector may capture dependency amongst the code lines in the corresponding code snippet. The processor-executable instructions, on execution, may further cause the processor to generate a high-level feature vector corresponding to each of the plurality of code snippets based on the corresponding embedding vector using a deep learning model. The processor-executable instructions, on execution, may further cause the processor to generate a final merged code including a final sequence of code lines by combining the sequence of code lines corresponding to the plurality of code snippets using the deep learning model. The deep learning model may be configured to iteratively arrange the sequence of code lines corresponding to each of the plurality of code snippets, based on the high-level feature vector corresponding to each of the plurality of code snippets, in order to resolve a merge conflict amongst the plurality of code snippets. It should be noted that the deep learning model may be trained to generate the high-level feature vector and arrange the sequence of code lines based on historical data from the software development life cycle.

In yet another embodiment, a non-transitory computer-readable medium storing computer-executable instruction for automating software development life cycle is disclosed. The stored instructions, when executed by a processor, may cause the processor to perform operations including receiving a plurality of code snippets being utilized for developing a software application from a plurality of sources in a software development life cycle. It should be noted that each of the plurality of code snippets may include a sequence of code lines. The operations may further include generating a plurality of embedding vectors corresponding to the plurality of code snippets. It should be noted that each embedding vector may capture dependency amongst the code lines in the corresponding code snippet. The operations may further include generating a final merged code including a final sequence of code lines by combining the sequence of code lines corresponding to the plurality of code snippets using the deep learning model. The deep learning model may be configured to iteratively arrange the sequence of code lines corresponding to each of the plurality of code snippets, based on the high-level feature vector corresponding to each of the plurality of code snippets, in order to resolve a merge conflict amongst the plurality of code snippets. It should be noted that the deep learning model may be trained to generate the high-level feature vector and arrange the sequence of code lines based on historical data from the software development life cycle.

BRIEF DESCRIPTION OF THE DRAWINGS

The present application can be best understood by reference to the following description taken in conjunction with the accompanying drawing figures, in which like parts may be referred to by like numerals

DETAILED DESCRIPTION

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
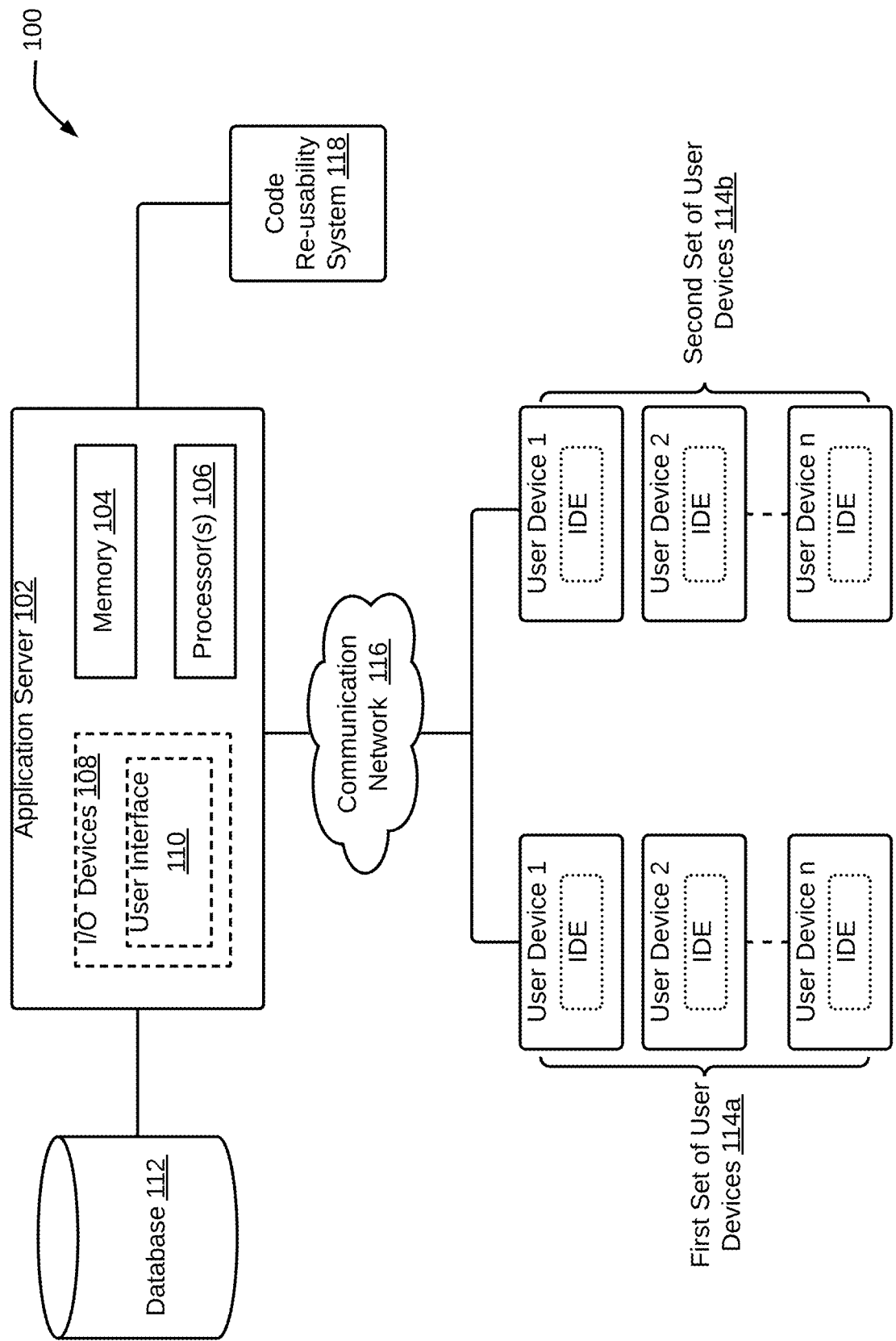
FIG. 1 is a block diagram of an exemplary system for automating software development life cycle, in accordance with some embodiments of the present disclosure.

Referring now to FIG. 1, an exemplary system for automating software development life cycle is illustrated, in accordance with some embodiments of the present disclosure. In an embodiment, the system 100 may be used to resolve aforementioned problems by automatically generating a final merged code based on a plurality of code snippets, using an application server 102. A code snippet may correspond to a section of a code script. Further, the application server 102 generates the final merged code by resolving a merge conflicts, if present, among a plurality of code snippets. In particular, the application server 102 may receive the plurality of code snippets from different sources. For example, the application server 102 may receive the plurality of code snippets from various developers via user devices 114, and a code reusability system 118. Additionally, for example, the application server 102 may receive the plurality of code snippets from a database (not shown).

The final merged code may be generated using a deep learning model hosted on the application server 102, in order to automate the software development life cycle. The application server 102 may include a memory 104, a processor 106, and an input/output (I/O) device 108. The I/O device 108 may further include a user interface 110. A user, an administrator or developers may interact with the application server 102 and vice versa through the user interface 110. By way of an example, the user interface 110 may be used to provide results of analysis performed by the application server 102, to the user. By way of another example, the user interface 110 may be used by the user/administrator/developers to provide inputs to the application server 102.

As will be described in greater detail herein below, in order to automate software development life cycle for developing an application, the application server 102 may receive the plurality of code snippets via one or more communicatively connected sources such as user devices 114, the code reusability system 118 or a database 112. The system 100 includes two different sets of user devices 114, i.e., a first set of user devices 114a and a second set of user devices 114b, for different projects (say, for developing two different applications). The first set of user devices 114a may include a user device 1, user device 2, and user device n. Similarly, the second set of user devices 114b may include 'n' number of user devices. By way of an example, the first set of user devices 114a may be considered for developing one application and the second set of user devices 114b is considered for developing another application. Additionally, in some embodiments, the application server 102 may extract information communicatively a database 112.

The memory 104 and the processor 106 of the application server 102 may perform various functions including receiving the code snippets, processing the code snippets, generating embedding vectors, generating high-level feature vectors, and generating the final merged code. The memory 104 may store instructions that, when executed by the processor 106, cause the processor 106 to generate the final merged code automatically, in accordance with some embodiments of the present invention. The memory 104 may also store various data that may be captured, processed, generated, and/or required by the application server 102. The memory 104 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.).

In some embodiments, the application server 102 may interact with developers via two sets of user devices 114a and 114b over a communication network 116. The user or developers may provide inputs to the application server 102 via the user interface 110. Thus, for example, in such embodiments, the application server 102 may ingest information associated with application development provided by the developers or the code reusability system 118 via the user devices 114. Further, for example, in such embodiments, the application server 102 may render results (e.g., the final merged code) to the user/administrator via the user devices 114. The user devices 114 may include, but may not be limited to, a desktop, a laptop, a notebook, a netbook, a tablet, a smartphone, a remote server, a mobile phone, or another computing system/device. The communication network 116 may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

Further, the application server 102 may interact with the user devices 114 and/or the database 112 for sending/receiving various data. For example, in some embodiments, the application server 102 may extract information from the database 112 (for example, historical code snippets and historical usage patterns of different applications) or send the generated results to the database 112. Similarly, for example, in some embodiments, the application server 102 may interact with the user devices 114 for sending and receiving various data.

Figure 2:
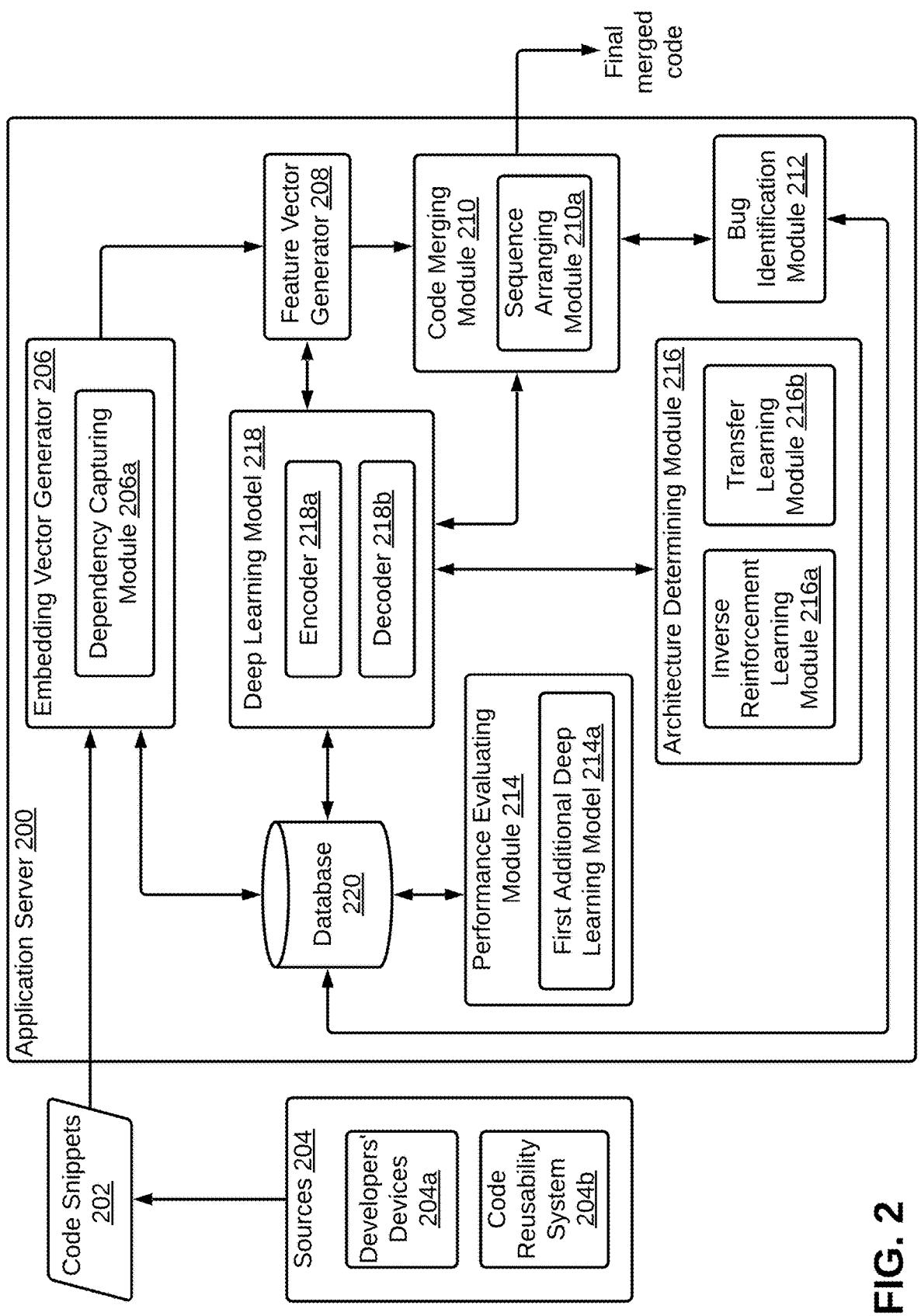
FIG. 2 is a functional block diagram of an exemplary application server, in accordance with some embodiments of the present disclosure.

Referring now to FIG. 2, a block diagram of an exemplary application server 200 (analogous to the application server 102 implemented by the system 100 of FIG. 1) is illustrated, in accordance with some embodiments of the present disclosure. The application server 200 may receive a plurality of code snippets 202 from at least one of a plurality of sources 204 through a user Interface. The plurality of sources 204 may include developer devices 204a (similar to the user devices 114) and a code reusability system 204b. In some embodiments, the code snippets may also be received from a database. In particular, the application server 200 may organize various functions under various modules including, but not limited to, an embedding vector generator 206, a feature vector generator 208, a code merging module 210, a bug identification module 212, a performance evaluating module 214, and an architecture determining module 216. Besides the modules 206-216, the application server 200 may also include a deep learning model 218, and a database 220. Here, a code snippet may correspond to a section of a full code script. It should be noted that the code snippet or the full code script may be in any programming language such as, Java, C, C++, Python, and the like. The plurality of code snippets 202 may be used to develop an application in a software development cycle. It may be apparent to a person skilled in art that each of the plurality of code snippets comprises a sequence of code lines.

The embedding vector generator 206 may be configured to receive the plurality of code snippets 202 from the plurality of sources 204. Further, a plurality of embedding vectors corresponding to the plurality of code snippets 202 may be generated by the embedding vector generator 206. In some embodiments, one embedding vector may be generated corresponding to each code snippet. Further, the embedding vector generator 206 may include a dependency capturing module 206a. The dependency capturing module 206a may be configured to capture dependency amongst the code lines in the corresponding code snippet based on the associated emending vector, for each of the plurality of embedding vectors.

The embedding vector generator 206 may employ any sentence embedding model that uses a natural language processing (NLP) and/or natural language understanding (NLU) capabilities so as to process and understand codebase at basic level. The sentence embedding model may include, but may be not limited to, a Bidirectional Encoder Representations from Transformers (BERT) model, a Robustly optimized BERT(RoBERT) model, Distil BERT, XLNeT, a Word2Vec model, a Glove model, a FastText model, a Sent2Vec model, a Doc2VecC model, and a Word Mover's Embedding (WME) model. The embedding vector generator 206 may be communicatively connected to the database 220 and the feature vector generator 208. In some embodiments, the embedding vector generator 206 may fetch the code snippets from the database 220. Further, the generated plurality of embedding vectors corresponding to the plurality of code snippets 202 may be transmitted to the feature vector generator 208.

The feature vector generator 208 may be configured to receive the plurality of embedding vectors corresponding to the plurality of code snippets 202. Further, the feature vector generator 208 may generate a high-level feature vector corresponding to each of the plurality of code snippets 202 based on the corresponding embedding vector using the deep learning model 218. The deep learning model 218 may include an encoder 218a and a decoder 218b. The feature vector generating module may use the encoder 218a in order to generate the high-level feature vectors.

The code merging module 210 may generate a final merged code using the deep learning model 218. The final merged code may have a final sequence of code lines. In particular, the code merging module 210 may use the decoder 219b for generating the final merged code. The sequence of code lines corresponding to the plurality of code snippets 202 may be combined to generate the final merged code with the final sequence of code lines. The code merging module 210 may include a sequence arranging module 210a. The sequence arranging module 210a may iteratively arrange the sequence of code lines using the deep learning model 218. The code merging module 210 may be further communicatively coupled to the bug identification module 212

The bug identification module 212 may identify one or more software bugs in the final merged code. The bug identification module 212 may include an artificial intelligence (AI) model. In order to identify the one or more software bugs, the bug identification module 212 may compare the usage pattern of the software application with historical usage patterns of similar software applications using the AI model. In case of any software bug in the final merged code, a resolution to fix the software bugs may be recommended.

The performance evaluating module 214 may be configured to evaluate a performance of the software application. To evaluate the performance, the performance evaluating module 214 may include a first additional deep learning model 214a. The first additional deep learning model 214a may be selected from, but not limited to, a deep Long Short-Term Memory (LSTM) model and a Gated Recurrent Unit (GRU) network model. It should be noted that the first additional deep learning model is trained with historical data from similar software applications. Further the performance evaluating module 214 may determine a plurality of benchmark values corresponding to a plurality of performance parameters for the software application.

The architecture determining module 216 of the application sever 200 may be configured to determine a modified architecture for the deep learning model 218. The modified architecture of the deep learning model 218 may be determined for each new software development cycle that involves development of a similar or a new software application. The similar or the new software application may be in any programming language (for example, Java, C, C++, Python, and the like). In particular, the similar or the new software application may be in a same or a different programming language as that of the software application. The architecture determining module 216 may include an Inverse Reinforcement Learning (IRL) module 216a and a Transfer Learning (TL) module 216b. For example, the IRL module 216a may employ IRL when the similar software application (say, an application similar to existing application) is detected in the new development cycle. In particular, the IRL module 216a may employ IRL to identify architecture of deep learning model to be used. It uses historical data to achieve the same. Similarly, the TL module 216b may be employ TL when the new software application is detected in the new development cycle. In some embodiments, the TL module 216b may utilize previous implementation of same system and leverage that knowledge to train new implementation of same system.

It should be noted that the application server 102 may be implemented in programmable hardware devices such as programmable gate arrays, programmable array logic, programmable logic devices, or the like. Alternatively, the application server 102 may be implemented in software for execution by various types of processors. An identified engine/module of executable code may, for instance, include one or more physical or logical blocks of computer instructions which may, for instance, be organized as a component, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for automating software development life cycle. For example, the exemplary system 100 and associated application server 102 may automate software development life cycle, by the process discussed herein. In particular, as will be appreciated by those of ordinary skill in the art, control logic and/or automated routines for performing the techniques and steps described herein may be implemented by the system 100 and the associated application server 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all the processes described herein may be included in the one or more processors on the system 100.

Figure 3:
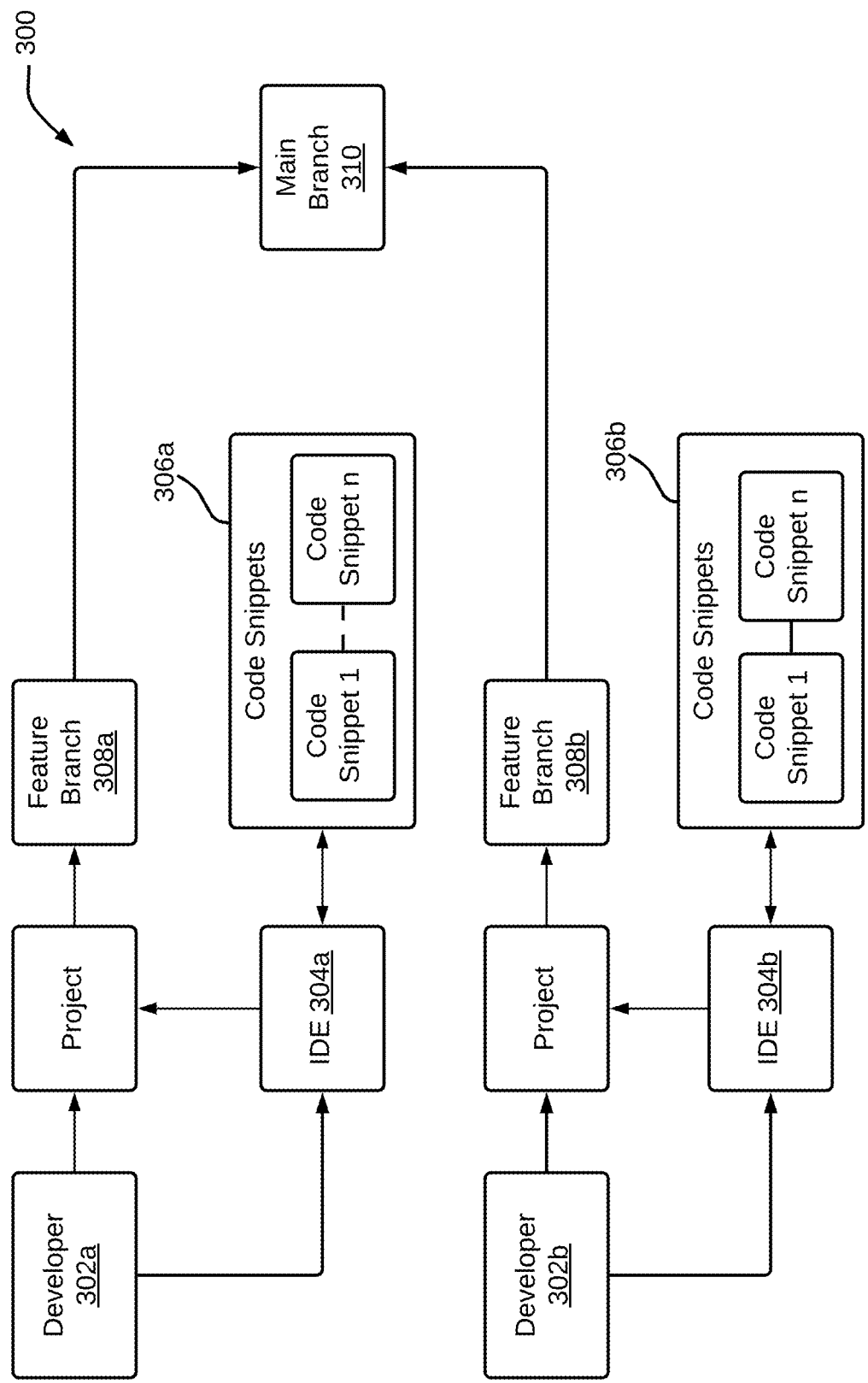
FIG. 3 is a block diagram of an exemplary system for developing a software application during a software development cycle, in accordance with some embodiments of the present disclosure.

Referring now to FIG. 3, a block diagram of an exemplary system 300 for developing a software application during a software development cycle, in accordance with some embodiments of the present disclosure. The system 300 includes two developers 302a and 302b. In current scenario, instead of writing a new code from starting, the system 300 may use already available code snippets from a database or some other systems such as a code reusability system. The code reusability system may include a plurality of code snippets. The code reusability system may be used as plugin to Interactive Development Environments (IDE) 304a and 304b. The code re-usability system plugged-in to the IDE 304a and 304b may be Eclipse, Pycharm, and the like. The code re-usability system, when plugged-in to the system 300, may take a sequence of code steps or comments.

Based on the sequence of code steps, the code reusability system may recommend a list of relevant code snippets that may be leveraged while developing a particular feature of the application. For example, the code reusability system plugged in to the system 300 may recommend code snippets 306. The use of available code snippets may reduce time consumed for developing the application.

Further, the system 300 may include two feature branches 308a, 308b, and a main branch 310. In the main branch 310, a final merged code may be generated. Here, the developers 302a and 302b need to check the merged code manually, in case of any merge conflict. To this end, the developers may verify the merged code to the respective feature branches 308a, 308b, and then to the main branch 310, for resolving the merge conflict. The manual verification may be eliminated by employing an application server similar to the application server 102 and 200 which may automate process of resolving merge conflict. The application server may take the conflicted code along with code snippets from individual feature branches 308a and 308b as an input and subsequently generate a final merged code free of conflicts. This may be further explained in conjunction to FIG. 4.

Figure 4:
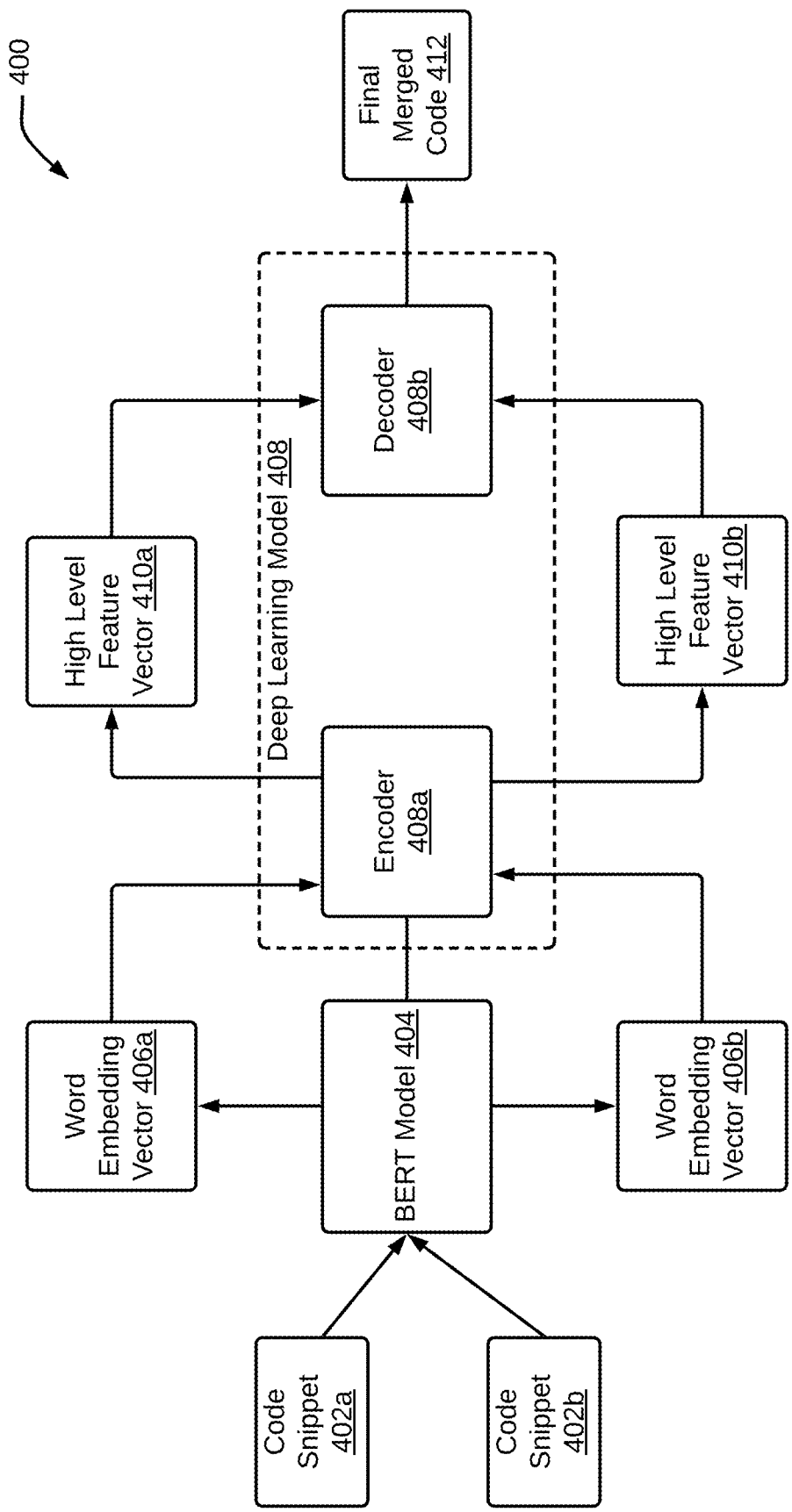
FIG. 4 illustrates an exemplary system for automatically generating a final merged code, in accordance with some embodiments of the present disclosure.

Referring now to FIG. 4, a block diagram of an exemplary system 400 for generating a final merged code automatically is illustrated, in accordance with some embodiments of the present disclosure. The process of generating the final merged code may be automated by introducing an application server similar the application server 102 and 200. The system 400 may include two code snippets 402a and 402b. In some embodiments, the code snippets 402a and 402b may be provided by two different developers. In some other embodiments, a system like a code reusability system 118 may be plugged into the system 400 to provide the code snippets 402a and 402b. The code reusability system may be plugged in to the system 400 for saving development time as explained in FIG. 3.

Further, the system 400 may include a BERT model 404. The BERT model 404 may generate the embedding vectors 406a and 406b, corresponding to each of the code snippets 402a and 402b. It should be noted that the BERT model may be used by an embedding vector generator (analogous to the embedding vector generator 206) of the application server. Further, the generated embedding vectors 406a and 406b may be transmitted to a deep learning model 408 (same as the deep learning model 218).

The deep learning model 408 may include an encoder 408a and a decoder 408b. In particular, the word embedding vectors may be transmitted to the encoder 408a. The encoder 408a may generate a high-level feature vector 410a corresponding to the code snippet 402a based on the corresponding embedding vector 406a. Similarly, a high-level feature vector 410b corresponding to the code snippet 402b based on the corresponding embedding vector 406b may be generated by the encoder 408a. Further, the high-level feature vectors 410a and 410b may be transmitted to the decoder 408b. The decoder 408b may generate a final merged code 412 including a final sequence of code lines. In order to generate the final merged code 412, sequence of code lines corresponding to the code snippets 402a and 402b may be combined together. In other words, the decoder 408b may use sequence to sequence learning. The sequence of code lines corresponding to the code snippets 402a and 402b may be arranged iteratively based on the high-level feature vectors 410a and 410b until a merge conflict between the code snippets 402a and 402b is resolved. It should be noted that the system 400 may also be capable of merging the code snippets 402a and 402b successfully, when the code snippets 402a and 402b are in different programming languages. The system 400 may not only identify the merge conflict but also resolve the merge conflict, when detected, proactively. In some embodiments, the deep learning model 408 may be trained initially, that may be explained further in greater detail in conjunction to FIG. 5.

Figure 5:
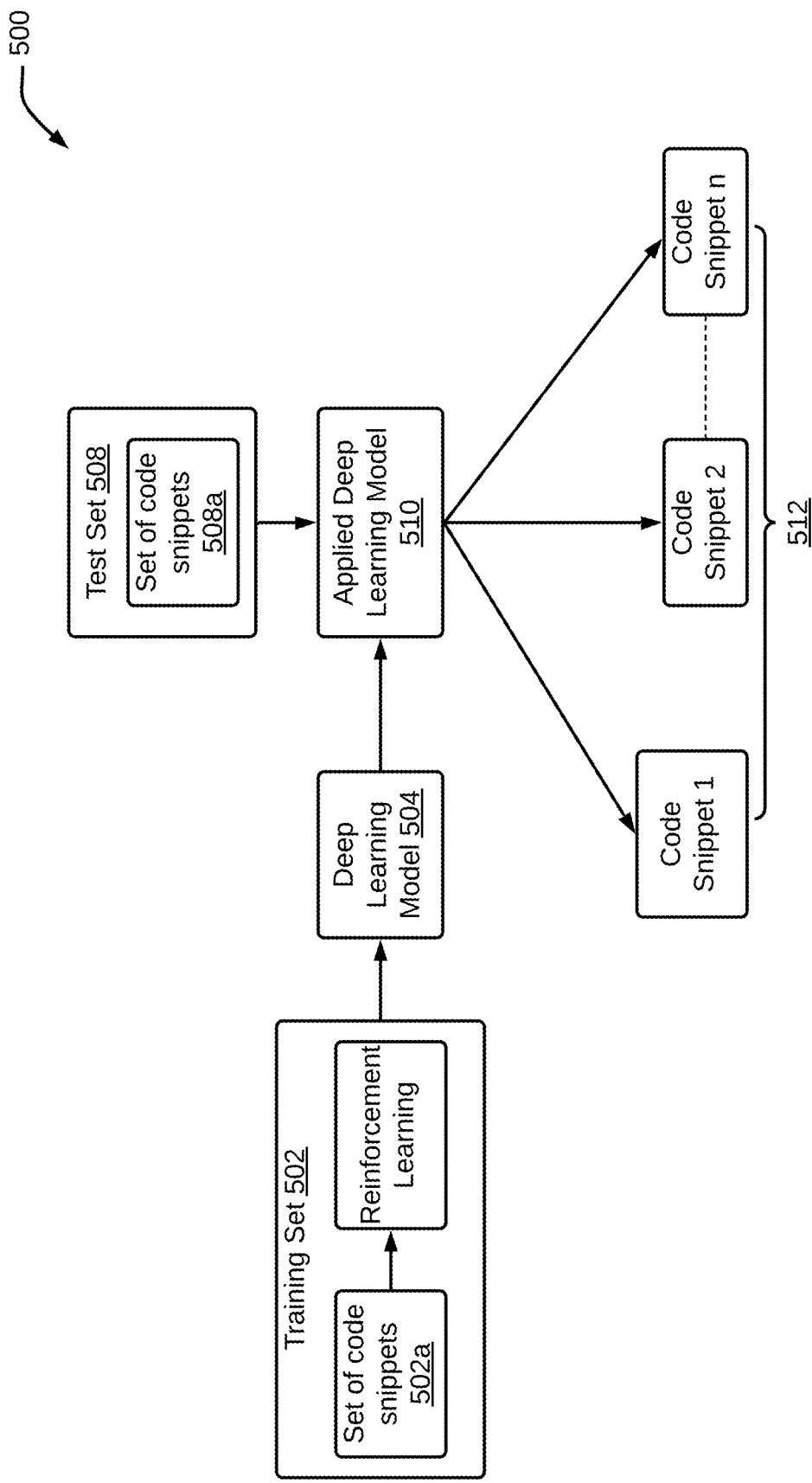
FIG. 5 is a block diagram of a system for training a deep learning model, in accordance with some embodiments of the present disclosure.

Referring now to FIG. 5, a block diagram of a system 500 for training a deep learning model 504 (similar to the deep learning model 408 deployed in system 400) is illustrated, in accordance with some embodiments of the present disclosure. A plurality of code snippets from different developers during same development cycle along with conflicted code and correct one may be provided as input to the deep learning model 504. During training phase, the system 500 may recommend set of probable code snippets 512 which may be correct along with their relevancy score.

Once the deep learning model 504 is trained, the deep learning model 504 may be exposed to a new training environment. The new training environment may have a training set 502 including a set of code snippets 502a along with merge conflict. It may be noted that the deep learning model 504 has never been exposed earlier to such training process. Here, a code re-usability method is used to generate the set of code snippets 502a. In case, the deep learning model 504 fails to resolve the problem then a feedback (say, negative feedback) may be captured. In short, Reinforcement Learning (RL) is used by the system 500, through which all possible scenarios may be created for training.

Particularly, a Temporal Difference learning (say, a class of RL) is used to calculate Q-values for the set of code snippets 502a during training period. It should be noted that Q-value of a particular code snippet represents preference of that code snippet over other code snippets to resolve the merge conflict. The Q-value actually represents probability of code snippet being preferred over other code snippets. These Q values may be used to penalize the system 500 when irrelevant code snippets are preferred over relevant one. Further, based on these Q-values corresponding to the set of code snippets 502a and their preference over one another may be used to generate the final merged code without any conflict or the set of portable code snippets 512. Consequently, a positive feedback may be captured. Otherwise the system 500 may be penalized and a negative feedback may be captured. Further, the system 500 may include an applied deep learning model 510 which is a trained model and tested using a test set 508 comprising a set of code snippets 508a.

In some embodiments, the system 500 may utilize historical records where historical data includes detailed information about the code snippets among which a merge conflict is present, and an action taken by developers to mitigate the merge conflict. The system 500 may use the historical records to penalize or boost preference of code snippets which have been trained on initial set of code snippets that have been generated or developed by developer or code reusability system.

Figure 6:
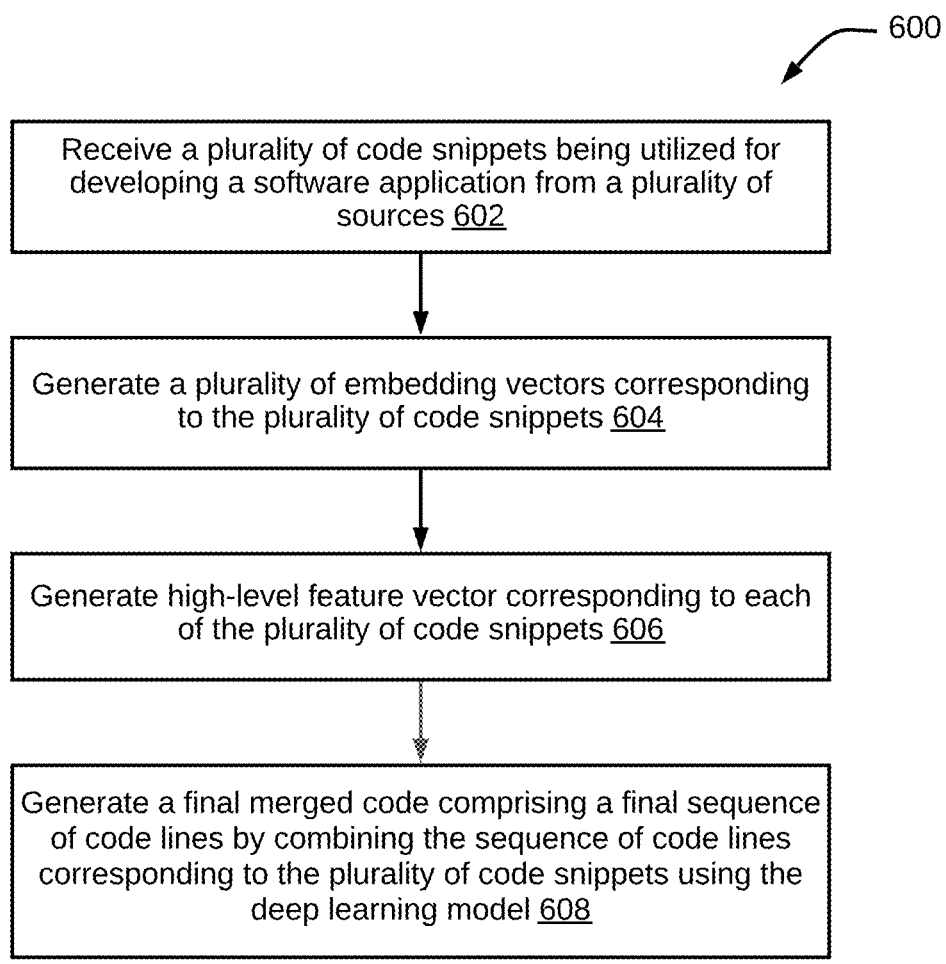
FIG. 6 is a flow diagram of an exemplary process for automating software development life cycle, in accordance with some embodiments of the present invention.

Referring now to FIG. 6, an exemplary process 600 for automating software development life cycle is depicted via a flowchart, in accordance with some embodiments of the present disclosure. Each of the steps of process 600 may be performed by various modules within the application server 200.

At step 602, a plurality of code snippets may be received. The plurality of code snippets is used for developing a software application. Further, the plurality of code snippets may be received from a plurality of sources during a software development cycle. By way of an example, the plurality of sources may include, but not limited to, a plurality of developers, a code reusability system, and a database. It should be noted that each of the plurality of code snippets includes a sequence of code lines Then, at step 604, a plurality of embedding vectors corresponding to the plurality of code snippets may be generated. It should be noted that each embedding vector captures dependency amongst the code lines in the corresponding code snippet. In some embodiments, the plurality of embedding vectors is generated by using a Bidirectional Encoder Representations from Transformers (BERT) model. In some other embodiments, other sentence embedding models that uses NLP/NLU may be used to generate the plurality of embedding vectors. For example, different versions of BERT, a Word2Vec, Glove, a FastText, a Sent2Vec, a Doc2VecC, a Word Mover's Embedding (WME) technique may be employed to generate embedding vectors.

At step 606, a high-level feature vector corresponding to each of the plurality of code snippets based on the corresponding embedding vector may be generated. A deep learning model may be employed for generating the high-level feature vector.

Finally, at step 608, a final merged code may be generated. The final merged code may include a final sequence of code lines. To generate the final merged code, the sequence of code lines corresponding to the plurality of code snippets may be combined. Further, the deep learning model may be utilized to iteratively arrange the sequence of code lines corresponding to each of the plurality of code snippets. It should be noted that the high-level feature vector corresponding to each of the plurality of code snippets may be considered to arrange the sequence of code lines and subsequently to resolve a merge conflict amongst the plurality of code snippets. Further, the deep learning model is trained to generate the high-level feature vector and arrange the sequence of code lines based on historical data from the software development life cycle.

With regards to the high-level feature vectors and the final merge code, the deep learning model may include an Encoder model and a Decoder model. The Encoder model may generate the high-level feature vector and the Decoder model may generate the final merged code. In some embodiments, a modified architecture for the deep learning model may be determined for developing a similar or a new software application in a new software development life cycle. It should be noted that at least one of an inverse reinforcement learning model and a transfer learning model may be used for determining the modified architecture for the deep learning model. The modified architecture includes a set of modified parameters for the deep learning model. And, the similar or the new software application is in a same or a different programming language as that of the software application. Historical data from various historical software development life cycles may be utilized while training the deep learning model. The historical data may include a plurality of historical code snippets from the plurality of sources and in a plurality of programming languages, one or more of the plurality of historical code snippets having conflicts, and a correct merged code for the plurality of historical code snippets. In some embodiments, historical data from various historical software development life cycles may be used for inverse reinforcement learning so as to identify new architecture of deep learning model or for transfer learning so as to identify new deep learning model altogether. Further, the transfer learning model from existing implementation of same system may be used for other implementations in order to reduce model training time.

Performance of a software application plays an important role which may actually affect end-users. Therefore, in some embodiments, a performance of the software application may be evaluated. In some embodiments, a first additional deep learning model may be used so as to evaluate the performance. The first deep learning model may be any sequence learning based neural network model such as a deep Long Short-Term Memory (LSTM) model and Gated Recurrent Unit (GRU) network model. Further, a plurality of benchmark values corresponding to a plurality of performance parameters may be determined for the software application, in order to evaluate the performance. It should be noted that the first additional deep learning model is trained with historical data from similar software applications. In other words, the first additional deep learning model is built and trained using pro-active learning, transfer learning, reinforcement learning, and/or inverse reinforcement learning.

By way of an example, for a conversational system or a chatbot system performance of the system should be very high to provide glimpse of real-time user experience. Various performance parameters such as, number of login requests in particular time period, time taken by the system to respond when a user action is taken, may be captured after every change in the chatbot system. In some embodiments, the above-mentioned performance parameters may also be captured when a new feature is released in the chatbot system. The performance parameters may be captured in order to ensure that the chatbot system is working as expected. It should be noted that a jMeter or a similar testing tool may be used test performance after every build. Further, benchmark values corresponding to the performance parameters may be evaluated based on performance testing tools results. The benchmark values may be calculated to understand the effect of new features on the performance parameters. In some cases, systems or software applications may be monitored while being in production.

In some embodiments, these performance parameters may be stored in a system such as, Splunk, Dynatrace, and the like. Nevertheless, it still needs some rules to be configured to identify any anomalous behaviour in the system. For, example, behaviour of the chatbot system is observed by calculating benchmark values for different intervals, when the login requests increased gradually. It should be noted that earlier requests or loads on a system may affect new requests or loads. Therefore, to resolve this is problem a sequence to sequence learning approach is used, where previous results may be used to calculate benchmark values for current requests.

Here, input to the chatbot system may be values such as minimum time, maximum time, average value, throughput, error rate etc. The input values together make a sequence at particular instance. Further, the chatbot system may provide benchmark values based on the input values. The benchmark values may be calculated depending upon a type of software application, as each software application has different requirement for the benchmark values. Therefore, some more performance parameters related to application type, during training, may be considered. Hence, each record in training set may look as: [Application Type, Metric Type, Minimum Value, Maximum Value, Average Value, Throughput, Error Rate . . . ]. For the chatbot system the training set may look as, [Chatbot, Login Requests, 2 seconds, 5 seconds, 3.4 seconds, 15.23, 0.04].

In short, to calculate benchmark values for a new application or an existing application, when a new feature is releases or a change is introduced, various steps including, performing a load test using testing tools for different time intervals, fetching the test results as an input followed by pre-processing, and normalizing the test results before applying the sequence to sequence learning approach for identifying corresponding benchmark values. In the first additional deep learning model, each records' output i.e. benchmark values may be used in next instance or for next record of similar type of application.

In some embodiments, a system may also recommend a list of benchmark values to a user, when the system is not sure of about final value. A feedback from user may be captured and further this feedback may be used for other similar type of applications to remove uncertainty in solution or the final value.

Additionally, in some embodiments, one or more software bugs in the final merged code may be identified. In order to identify the one or more software bugs, a comparison between the usage pattern of the software application and historical usage patterns of similar software applications may be performed. An artificial intelligence (AI) model may be employed for identifying the one or more software bugs. Accordingly, a resolution to fix the one or more software bugs may be recommended.

Further, a set of probable code snippets along with a set of corresponding relevancy scores may be generated. Here, each of the one or more code snippets having a merge conflict may be considered for generating the set of probable code snippets. In some embodiments, the deep learning model may be retuned based on a selection of one of the probable code snippets. In some embodiments, a developer may select one of the set of probable code snippets as a resolution to the merge conflict. In some embodiments, a second additional deep learning model may be employed to select one of the set of probable code snippets as a resolution to the merge conflict. In such embodiments, the second additional deep learning model may be any deep learning model such as a deep Convolutional Neural network (CNN) model. The technique may then employ concept of pro-active and/or active learning to capture the feedback from developers and/or the second additional deep learning model so as to perform retuning of the deep learning model.

Figure 7:
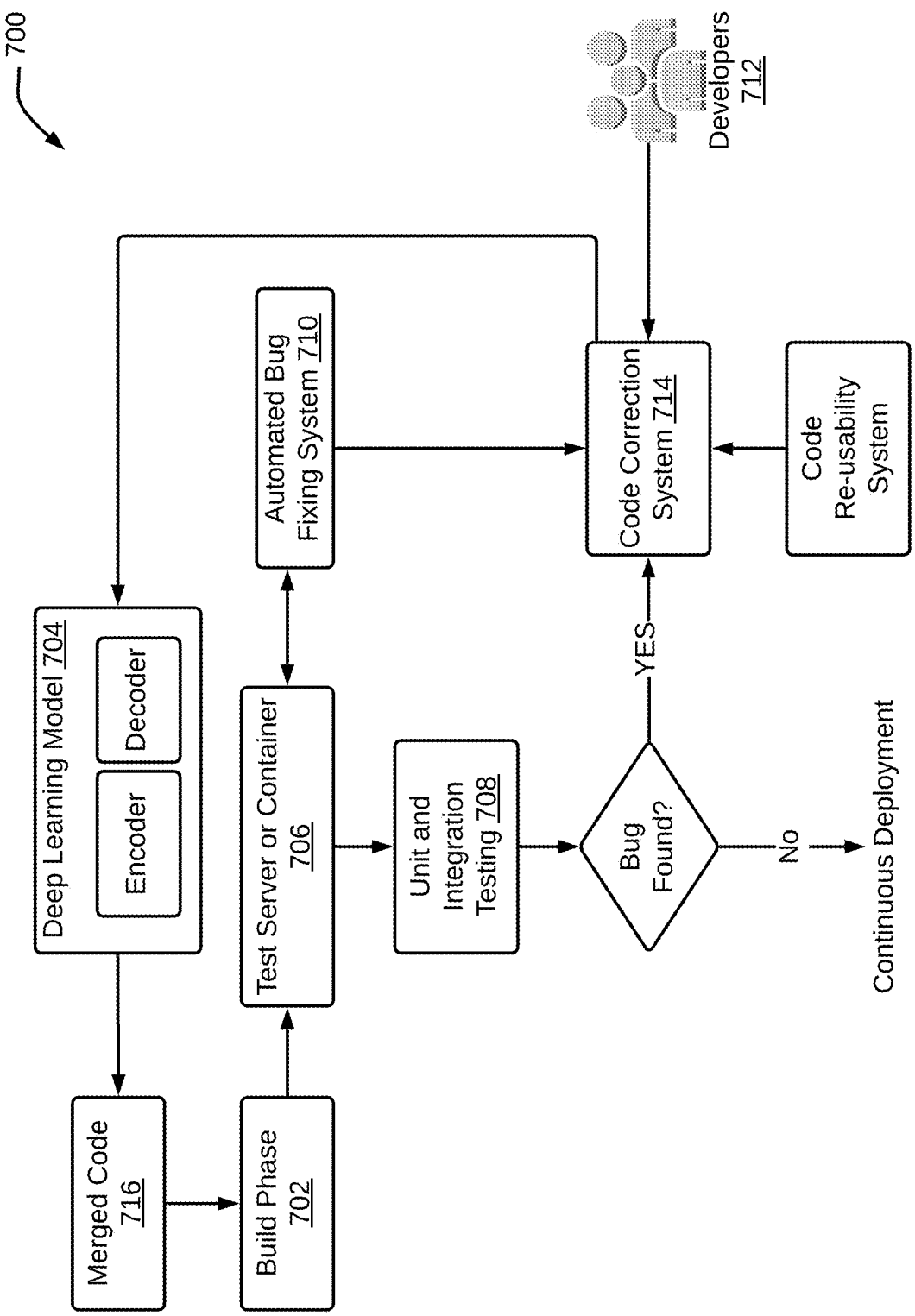
FIG. 7 is a block diagram of an exemplary system for continuous integration and development of software applications based on AI model, in accordance with some embodiments of the present invention.

Referring now to FIG. 7, a block diagram of an exemplary system 700 for continuous integration and development of software applications based on AI model is illustrated, in accordance with some embodiments of the present disclosure. The system 700 includes a build phase 702, wherein the merged code may be compiled, and a building package may be generated.

In some embodiments, IRL may be used to determine architecture of the deep learning model 704. It should be noted that more than one combination of algorithms may be recommended that may be examined later using RL. Further, optimal values of hyperparameters corresponding to each combination of algorithms may be recommended. The values of hyperparameters may be further validated against historical data from an existing environment This process may be referred as model hyperparameter tuning. Here, one of the combinations of algorithms may selected that provides optimal architecture of the deep learning model (Encoder-Decoder architecture) 704 as per historical data provided.

In some embodiments, Transfer Learning (TL) may be used to configure knowledge from an existing environment. This knowledge may include values of the hyper-parameters. It should be noted that the hyper-parameters may also be referred as model parameters. The values of model parameters may be used as initial values for building a new system to generate code without conflict for a new environment.

Once the build phase 702 is completed, the build package may be transmitted to a test server or container 706. Thereafter, a unit test and integration test 708 may be performed; and generated results may be sent to required stakeholders. A condition, whether a bug is present or not may be checked as illustrated in FIG. 7. When there is no bug found, deployment of application may be continued as explained in FIG. 3. A bug fixing system 710 may be used here for identifying a bug automatically. Time may be saved by deploying the bug fixing system 710, as the bug may be identified automatically rather than identifying manually by developers 712. Here, the bug fixing system 710 may be used to identify bugs by analysing usage patterns of the application deployed on server and accordingly bugs may be reported (If present). This system compares usage pattern of the application to usage pattern of previous similar type of application. In this way, bugs may be identified in current environment. And, a list of correct code snippets may be provided to developers 712. Then, the developers 712 may select relevant code snippets and submit the code again. The system 700 may generate merged code 716 in a similar way as explained in FIG. 4. Thereafter, during a new development cycle, again a new build packages may be created and deployed over the test server 706 to check for any bugs.

Thus, the present disclosure may help in eliminating manual requirements while developing a software application. The disclosure introduces an Artificial Intelligence (AI) based system and method that automates a software development life cycle. Rather than involving developers, the disclosed system automatically resolves merge conflict issues. Additionally, the system also evaluates performance of the software application automatically. Further, bugs are identified in developers' code by the system itself before pushing it to version control system. Moreover, the system may modify itself depending upon the type of application.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for automating software development life cycle, the method comprising:
    receiving, by an application server, a plurality of code snippets being utilized for developing a software application from a plurality of sources in a software development life cycle, wherein each of the plurality of code snippets comprises a sequence of code lines;
    generating, by the application server, a plurality of embedding vectors corresponding to the plurality of code snippets, wherein each embedding vector captures dependency amongst the code lines in the corresponding code snippet;
    generating, by the application server, a high-level feature vector corresponding to each of the plurality of code snippets based on the corresponding embedding vector using a deep learning model; and
    generating, by the application server, a final merged code comprising a final sequence of code lines by combining the sequence of code lines corresponding to the plurality of code snippets using the deep learning model, wherein the deep learning model is configured to iteratively arrange the sequence of code lines corresponding to each of the plurality of code snippets, based on the high-level feature vector corresponding to each of the plurality of code snippets, in order to resolve a merge conflict amongst the plurality of code snippets, and wherein the deep learning model is trained to generate the high-level feature vector and arrange the sequence of code lines based on historical data from the software development life cycle.

2. The method of claim 1, wherein the plurality of sources comprises at least one of a plurality of developers, a code reusability system, and a database.

3. The method of claim 1, wherein the plurality of embedding vectors is generated by using at least one of a Bidirectional Encoder Representations from Transformers (BERT) model.

4. The method of claim 1, wherein the deep learning model comprises an Encoder model and a Decoder model, and wherein the Encoder model generates the high-level feature vector and the Decoder model generates the final merged code.

5. The method of claim 1, further comprising:
    determining, by the application server, a modified architecture for the deep learning model for developing a similar or a new software application, in a new software development life cycle, using at least one of an inverse reinforcement learning model and a transfer learning model, wherein the modified architecture comprises a set of modified parameters for the deep learning model, and wherein the similar or the new software application is in a same or a different programming language as that of the software application.

6. The method of claim 1, further comprising:
    training, by the application server, the deep learning model using historical data from the software development life cycle, wherein the historical data comprises a plurality of historical code snippets from the plurality of sources and in a plurality of programming languages, one or more of the plurality of historical code snippets having conflicts, and a correct merged code for the plurality of historical code snippets.

7. The method of claim 1, further comprising:
evaluating, by the application server, a performance of the software application using a first additional deep learning model, wherein evaluating the performance comprises determining a plurality of benchmark values corresponding to a plurality of performance parameters for the software application, and wherein the first additional deep learning model is trained with historical data from similar software applications.

8. The method of claim 1, further comprising:
identifying one or more software bugs in the final merged code by comparing the usage pattern of the software application with historical usage patterns of similar software applications using an artificial intelligence (AI) model; and
recommending a resolution to fix the one or more software bugs.

9. The method of claim 1, wherein generating the final merged code further comprises:
generating a set of probable code snippets along with a set of corresponding relevancy scores corresponding to each of the one or more code snippets having a merge conflict; and
retuning the deep learning model based on a selection of one of the set of probable code snippets by at least one of a developer or a second additional deep learning model.

10. A system for automating software development life cycle, the system comprising:
a processor; and
a memory communicatively coupled to the processor, wherein the memory stores processor-executable instructions, which, on execution, causes the processor to:
receive a plurality of code snippets being utilized for developing a software application from a plurality of sources in a software development life cycle, wherein each of the plurality of code snippets comprises a sequence of code lines;
generate a plurality of embedding vectors corresponding to the plurality of code snippets, wherein each embedding vector captures dependency amongst the code lines in the corresponding code snippet;
generate a high-level feature vector corresponding to each of the plurality of code snippets based on the corresponding embedding vector using a deep learning model; and
generate a final merged code comprising a final sequence of code lines by combining the sequence of code lines corresponding to the plurality of code snippets using the deep learning model, wherein the deep learning model is configured to iteratively arrange the sequence of code lines corresponding to each of the plurality of code snippets, based on the high-level feature vector corresponding to each of the plurality of code snippets, in order to resolve a merge conflict amongst the plurality of code snippets, and wherein the deep learning model is trained to generate the high-level feature vector and arrange the sequence of code lines based on historical data from the software development life cycle.

11. The system of claim 10, wherein, at least one of:
the plurality of sources comprises at least one of a plurality of developers, a code reusability system, and a database;
the plurality of embedding vectors is generated by using at least one of a Bidirectional Encoder Representations from Transformers (BERT) model; and
the deep learning model comprises an Encoder model and a Decoder model, and wherein the Encoder model generates the high-level feature vector and the Decoder model generates the final merged code.

12. The system of claim 10, wherein the processor-executable instructions further cause the processor to determine a modified architecture for the deep learning model for developing a similar or a new software application, in a new software development life cycle, using at least one of an inverse reinforcement learning model and a transfer learning model, wherein the modified architecture comprises a set of modified parameters for the deep learning model, and wherein the similar or the new software application is in a same or a different programming language as that of the software application.

13. The system of claim 10, wherein the processor-executable instructions further cause the processor to train the deep learning model using historical data from the software development life cycle, wherein the historical data comprises a plurality of historical code snippets from the plurality of sources and in a plurality of programming languages, one or more of the plurality of historical code snippets having conflicts, and a correct merged code for the plurality of historical code snippets.

14. The system of claim 10, wherein the processor-executable instructions further cause the processor to evaluate a performance of the software application using a first additional deep learning model, wherein the performance is evaluated by determining a plurality of benchmark values corresponding to a plurality of performance parameters for the software application, and wherein the first additional deep learning model is trained with historical data from similar software applications.

15. The system of claim 10, wherein the processor-executable instructions further cause the processor to:
identify one or more software bugs in the final merged code by comparing the usage pattern of the software application with historical usage patterns of similar software applications using an artificial intelligence (AI) model; and
recommend a resolution to fix the one or more software bugs.

16. The system of claim 10, wherein the processor-executable instructions cause the processor to generate the final merged code by:
generating a set of probable code snippets along with a set of corresponding relevancy scores corresponding to each of the one or more code snippets having a merge conflict; and
retuning the deep learning model based on a selection of one of the set of probable code snippets by at least one of a developer or a second additional a second additional deep learning model.

17. A non-transitory computer-readable medium storing computer-executable instructions for automating software development life cycle, the computer-executable instructions configured for:
receiving a plurality of code snippets being utilized for developing a software application from a plurality of sources in a software development life cycle, wherein each of the plurality of code snippets comprises a sequence of code lines;

generating a plurality of embedding vectors corresponding to the plurality of code snippets, wherein each embedding vector captures dependency amongst the code lines in the corresponding code snippet;

generating a high-level feature vector corresponding to each of the plurality of code snippets based on the corresponding embedding vector using a deep learning model; and generating a final merged code comprising a final sequence of code lines by combining the sequence of code lines corresponding to the plurality of code snippets using the deep learning model, wherein the deep learning model is configured to iteratively arrange the sequence of code lines corresponding to each of the plurality of code snippets, based on the high-level feature vector corresponding to each of the plurality of code snippets, in order to resolve a merge conflict amongst the plurality of code snippets, and wherein the deep learning model is trained to generate the high-level feature vector and arrange the sequence of code lines based on historical data from the software development life cycle.

18. The non-transitory computer-readable medium of the claim 17, wherein the computer-executable instructions are further configured for:

determining a modified architecture for the deep learning model for developing a similar or a new software application, in a new software development life cycle, using at least one of an inverse reinforcement learning model and a transfer learning model, wherein the modified architecture comprises a set of modified parameters for the deep learning model, and wherein the similar or the new software application is in a same or a different programming language as that of the software application.

19. The non-transitory computer-readable medium of the claim 17, wherein the computer-executable instructions are further configured for:

training the deep learning model using historical data from the software development life cycle, wherein the historical data comprises a plurality of historical code snippets from the plurality of sources and in a plurality of programming languages, one or more of the plurality of historical code snippets having conflicts, and a correct merged code for the plurality of historical code snippets.

20. The non-transitory computer-readable medium of the claim 17, wherein the computer-executable instructions are further configured for:

evaluating a performance of the software application using a first additional deep learning model, wherein evaluating the performance comprises determining a plurality of benchmark values corresponding to a plurality of performance parameters for the software application, and wherein the first additional deep learning model is trained with historical data from similar software applications.

* * * * *